(No Model.)
J. B. DUNLOP.
BICYCLE.
No. 441,649. Patented Dec. 2, 1890.
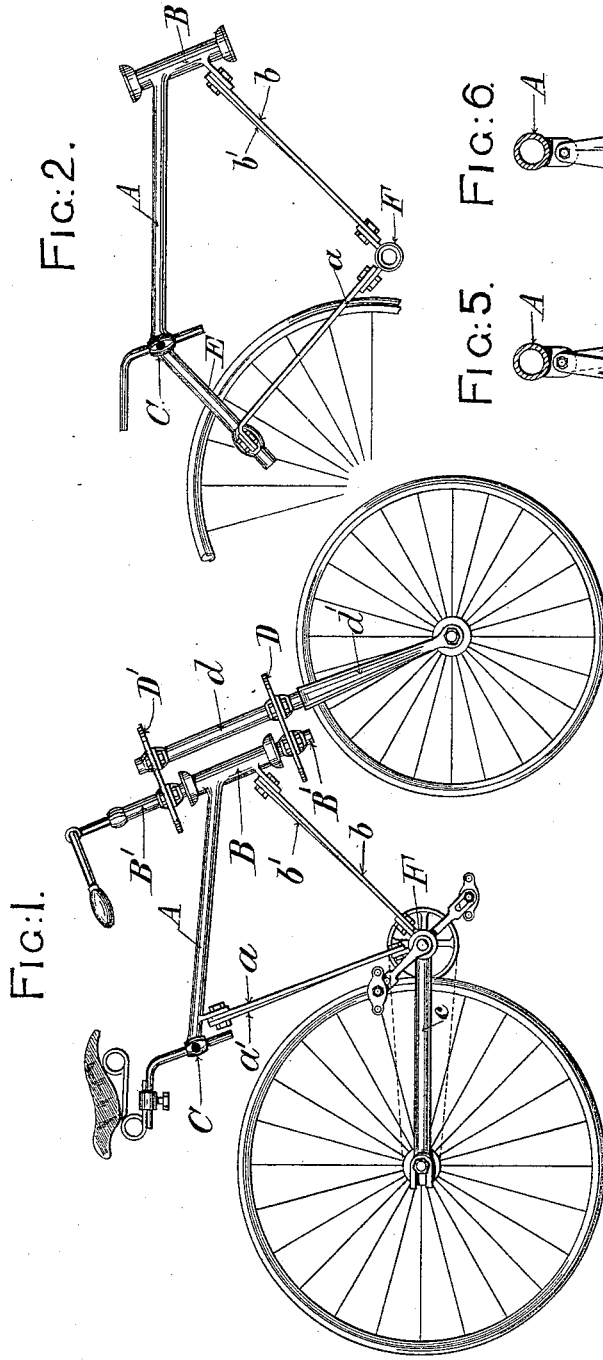
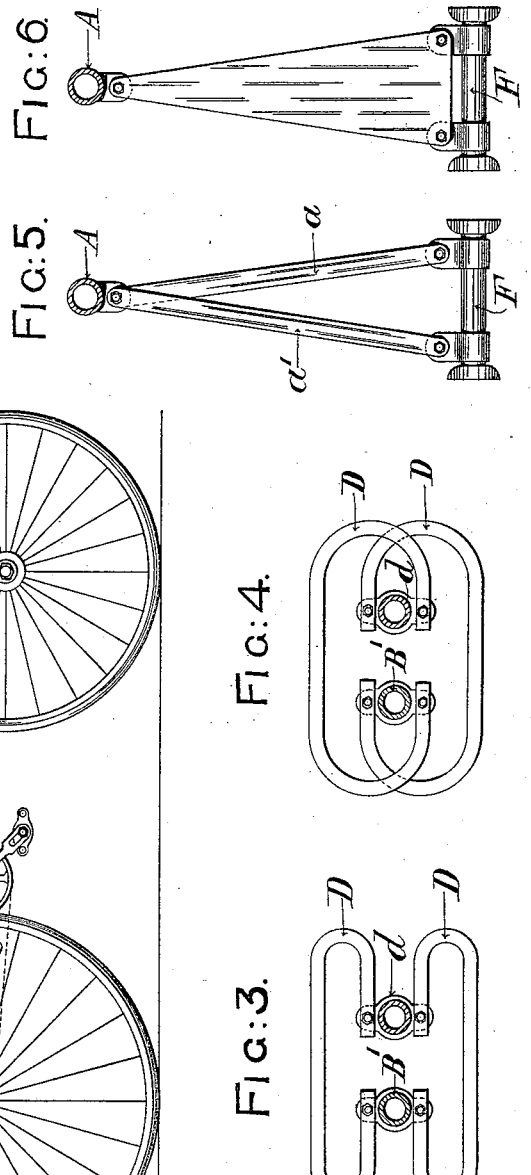
WITNESSES:
Benjamin King.
George Brookes
INVENTOR:
John Boyd Dunlop,
per James Stevenson
Attorney.

UNITED STATES PATENT OFFICE.

JOHN BOYD DUNLOP, OF BELFAST, IRELAND.

BICYCLE.

SPECIFICATION forming part of Letters Patent No. 441,649, dated December 2, 1890.

Application filed September 6, 1890. Serial No. 364,201. (No model.)

*To all whom it may concern:*

Be it known that I, JOHN BOYD DUNLOP, veterinary surgeon, a subject of the Queen of Great Britain, residing at 50 Gloucester Street, Belfast, Ireland, have invented certain new and useful Improvements in Frames for Rear-Driving Safety Bicycles and other Cycles; and I do hereby declare that the following is a full, clear, and exact description of the same.

This invention, which is based upon that described in the specification accompanying my former application for Letters Patent filed January 20, 1890, has for its object to produce a spring-frame for Safety bicycles and other cycles in which flexible metallic bars or rods are employed to reduce vibration while maintaining the position of the seat relatively to the central axis of the steering-post and that of the crank-axle always constant.

The improved frame according to my present invention is simple in construction, and is so arranged that the working joints or hinges usually employed in spring-frames are rendered unnecessary.

In the accompanying drawings, Figure 1 is a side elevation of my improved frame adapted to a rear-driving Safety bicycle. Fig. 2 is also a side elevation of the frame shown detached and slightly modified in form. Figs. 3 and 4 are plan views of the springs which connect the steering-post with the front fork; and Figs. 5 and 6 are elevational detached views of the yielding or "springy" portion of the supporting frame-work, hereinafter more particularly referred to.

In accordance with my invention that part of the frame to the rear of the steering-socket assumes a form somewhat analogous to that of an ordinary diamond frame, with the stays, support, or fork between the seat-pillar socket and the axle of the rear wheel removed.

The frame comprises a rigid tube A, firmly bolted, brazed, or otherwise united to the upper end of the steering-socket B or steering center neck-pin, and extending horizontally, or nearly so, rearward to the seat-pillar socket C, to which it is also firmly secured. Two bars $a\ a'$, of flexible spring-steel, are bolted or otherwise secured at their lower ends to lugs or brackets formed on the crank-axle bearing-case F and at their upper ends to a lug or bracket formed on the rigid tube A, adjacent to the seat-pillar socket C. The spring-bars $a\ a'$ may extend upward from the crank-axle case at any desired angle, and may be made to pass on each side of the rear wheel and be attached to a fork E, projecting from the seat-pillar socket C, in place of being attached to the tube A, as shown in Fig. 2. Two other bars $b\ b'$, also of spring-steel, are secured by their rear ends to lugs or brackets on the crank-axle case F, the anterior ends of said bars being bolted to a lug on the lower end of the steering-socket B. The rear horizontal rigid fork $c$ is made sufficiently strong to bear all strain on the rear wheel. A tube $d$ is brazed or similarly secured on the crown of the front fork $d'$ and is placed an inch or so (more or less) in front of the steering-socket B and parallel thereto. The tube $d$ is connected at its upper end to the steering-pillar B' by means of the two flat bars of spring-steel D', curved or bent angularly in a horizontal or inclined plane, Fig. 3. Said tube $d$ is also connected at its lower end to the steering-post B' by two similar springs D. The ends of the springs D D' are preferably bolted to lugs or brackets formed on the steering-post B' and tube $d$. These springs are disposed one on each side of the steering-post and tube, as shown in Figs. 1 and 3. They may, however, entirely or partly surround the steering-post and tube, in which latter case one spring of each pair would be slightly above or below the other, Fig. 4.

It will be seen that the spring-bars $a\ a'$ and $b\ b'$, Figs. 1, 2, and 5, form the sides of two triangles with the crank-axle-bearing case F as a base common to both. Therefore the points where $a\ a'$ and $b\ b'$ meet are maintained perpendicularly to the center of the crank-axle case F, while the bars $a\ a'$ and $b\ b'$, by their lower ends, maintain the crank-axle case F parallelwise to the axles of the front and rear wheels, the flexibility of the said spring-steel bars permitting the crank-axle case to slightly rotate on its own axis as soon as the weight of the rider is thrown on the machine and when vertical motion is imparted to the rear end of the horizontal fork $c$ owing to the rise and fall of the rear wheel caused by the inequalities of the road or other surface.

When it is desirable to increase the width of the base of the triangular portion of the frame, the lug on the crank-axle case farthest from the chain-wheel may be placed at an increased distance from the center of the axle-case relatively to the lug adjoining the chain-wheel.

A single spring-bar tapering in width from the top or front end to the lower or rear end, Fig. 6, might be substituted in lieu of the duplicate bars $a\ a'\ b\ b'$ and be bifurcated, if so desired.

The springs or curved bars D D' at the front of the machine permit of an easy vertical motion, whereby the vibration from the front wheel is considerably lessened. These springs might be placed lower down on each side of the wheel, in which case the steering-post would be provided with a forked extension, each member of which would be connected by means of said springs to a tube running parallel to such forked extension and resting on each end of the axle of the front wheel, the tube $d$ being dispensed with.

In the case of a lady's bicycle the springs $a\ a'$ might be made shorter and the tube A curved downward in the center to correspond.

Having now particularly described and ascertained the nature of my said invention and in what manner the same is to be performed, I declare that what I claim is—

1. A frame for cycles wherein the weight of the rider is supported directly from the crank-axle-bearing case by means of diagonal duplicated or bifurcated spring-steel bars $a\ a'\ b\ b'$, substantially as set forth and shown, and for the purposes specified.

2. In combination with a cycle-frame wherein the weight of the rider is supported directly from the crank-axle case by spring-bars $a\ a'$ and $b\ b'$, the employment of bent or curved spring-steel bars D D', which connect the steering-post and front fork together parallel to each other, all for the purpose of intercepting vibration, substantially as herein set forth and shown.

In testimony that I claim the foregoing as my invention I affix my signature in presence of two witnesses.

JOHN BOYD DUNLOP.

Witnesses:
GEORGE BAXTER,
*Writing Clerk*, 71 *Grosvenor St., Belfast.*
ARTHUR STEELE,
*Writing Clerk, The Grove Lodge, Belfast.*